United States Patent
Zhu (10) Patent No.: US 11,550,125 B2
(45) Date of Patent: Jan. 10, 2023

(54) CAMERA OPTICAL LENS

(71) Applicant: AAC Optics (Changzhou) Co., Ltd., Changzhou (CN)

(72) Inventor: Junyan Zhu, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 231 days.

(21) Appl. No.: 17/129,940

(22) Filed: Dec. 22, 2020

(65) Prior Publication Data
US 2021/0263270 A1 Aug. 26, 2021

(30) Foreign Application Priority Data
Feb. 24, 2020 (CN) .......................... 202010111299.3

(51) Int. Cl.
*G02B 13/00* (2006.01)
*G02B 9/34* (2006.01)
*G02B 27/00* (2006.01)

(52) U.S. Cl.
CPC ............. *G02B 13/004* (2013.01); *G02B 9/34* (2013.01); *G02B 27/0025* (2013.01)

(58) Field of Classification Search
CPC ........ G02B 9/34; G02B 13/004; G02B 13/06; G02B 27/0025
See application file for complete search history.

(56) References Cited

FOREIGN PATENT DOCUMENTS

CN 102540425 B * 8/2016 ........... G02B 13/004

* cited by examiner

*Primary Examiner* — Jack Dinh
(74) *Attorney, Agent, or Firm* — W&G Law Group (57) ABSTRACT

Provided is a camera optical lens including first to fourth lenses. The camera optical lens satisfies: $0.10 \leq R1/R2 \leq 0.20$; $1.10 \leq R3/R4 \leq 1.50$; $5.50 \leq R5/R6 \leq 6.50$; and $-6.50 \leq f2/f \leq -4.50$, where f denotes a focal length of the camera optical lens; f2 denotes a focal length of the second lens; R1 denotes a curvature radius of an object side surface of the first lens; R2 denotes a curvature radius of an image side surface of the first lens; R3 denotes a curvature radius of an object side surface of the second lens; R4 denotes a curvature radius of an image side surface of the second lens; R5 denotes a curvature radius of an object side surface of the third lens; and R6 denotes a curvature radius of an image side surface of the third lens. The camera optical lens has good optical performance while satisfying design requirements for ultra-thin, wide-angle lenses having large apertures.

10 Claims, 8 Drawing Sheets

CAMERA OPTICAL LENS

TECHNICAL FIELD

The present disclosure relates to the field of optical lens, and more particularly, to a camera optical lens suitable for handheld terminal devices such as smart phones or digital cameras and camera devices such as monitors or PC lenses.

BACKGROUND

With the emergence of smart phones in recent years, the demand for miniature camera optical lens is increasingly higher, but in general the photosensitive devices of camera optical lens are nothing more than Charge Coupled Devices (CCDs) or Complementary Metal-Oxide Semiconductor Sensors (CMOS sensors). As the progress of the semiconductor manufacturing technology makes the pixel size of the photosensitive devices become smaller, plus the current development trend of electronic products towards better functions and thinner and smaller dimensions, miniature camera optical lenses with good imaging quality have become a mainstream in the market.

In order to obtain better imaging quality, the lens that is conventionally equipped in mobile phone cameras adopts a three-piece lens structure. However, with the development of technology and the increasingly diverse demands of users, the pixel area of photosensitive devices is becoming smaller and smaller and the requirement of the system on the imaging quality is increasingly higher, a four-piece lens structure gradually emerges in lens designs. Although the common four-piece lens has good optical performance, its settings on refractive power, lens spacing and lens shape still have some deficiencies, which result in that the lens structure cannot have a good optical performance while satisfying design requirements for ultra-thin, wide-angle lenses having large apertures.

SUMMARY

In view of the problems, the present disclosure provides a camera optical lens, which has high imaging performance while satisfying design requirements for ultra-thin, wide-angle lenses having large apertures.

In an embodiment, the present disclosure provides a camera optical lens. The camera optical lens includes, from an object side to an image side, a first lens having a positive refractive power, a second lens having a negative refractive power, a third lens having a positive refractive power, and a fourth lens having a negative refractive power. The camera optical lens satisfies following conditions: $0.10 \leq R1/R2 \leq 0.20$; $1.10 \leq R3/R4 \leq 1.50$; $5.50 \leq R5/R6 \leq 6.50$; and $-6.50 \leq f2/f \leq -4.50$, where f denotes a focal length of the camera optical lens; f2 denotes a focal length of the second lens; R1 denotes a curvature radius of an object side surface of the first lens; R2 denotes a curvature radius of an image side surface of the first lens; R3 denotes a curvature radius of an object side surface of the second lens; R4 denotes a curvature radius of an image side surface of the second lens; R5 denotes a curvature radius of an object side surface of the third lens; and R6 denotes a curvature radius of an image side surface of the third lens.

As an improvement, the camera optical lens further satisfies a following condition: $5.50 \leq d1/d2 \leq 7.50$, where d1 denotes an on-axis thickness of the first lens; and d2 denotes an on-axis distance from the image side surface of the first lens to the object side surface of the second lens.

As an improvement, the camera optical lens further satisfies following conditions: $0.53 \leq f1/f \leq 1.81$; $-3.00 \leq (R1+R2)/(R1-R2) \leq -0.82$; and $0.07 \leq d1/TTL \leq 0.26$, where f1 denotes a focal length of the first lens; d1 denotes an on-axis thickness of the first lens; and TTL denotes a total optical length from the object side surface of the first lens to an image plane of the camera optical lens along an optic axis.

As an improvement, the camera optical lens further satisfies following conditions: $2.52 \leq (R3+R4)/(R3-R4) \leq 17.98$; and $0.03 \leq d3/TTL \leq 0.12$, where d3 denotes an on-axis thickness of the second lens; and TTL denotes a total optical length from the object side surface of the first lens to an image plane of the camera optical lens along an optic axis.

As an improvement, the camera optical lens further satisfies following conditions: $0.22 \leq f3/f \leq 0.75$; $0.68 \leq (R5+R6)/(R5-R6) \leq 2.17$; and $0.12 \leq d5/TTL \leq 0.39$, where f3 denotes a focal length of the third lens; d5 denotes an on-axis thickness of the third lens; and TTL denotes a total optical length from the object side surface of the first lens to an image plane of the camera optical lens along an optic axis.

As an improvement, the camera optical lens further satisfies following conditions: $-0.94 \leq f4/f \leq -0.26$; $0.50 \leq (R7+R8)/(R7-R8) \leq 1.87$; and $0.05 \leq d7/TTL \leq 0.15$, where f4 denotes a focal length of the fourth lens; R7 denotes a curvature radius of an object side surface of the fourth lens; R8 denotes a curvature radius of an image side surface of the fourth lens; d7 denotes an on-axis thickness of the fourth lens; and TTL denotes a total optical length from the object side surface of the first lens to an image plane of the camera optical lens along an optic axis.

As an improvement, the camera optical lens further satisfies a following condition: $TTL/IH \leq 1.86$, where TTL denotes a total optical length from the object side surface of the first lens to an image plane of the camera optical lens along an optic axis; and IH denotes an image height of the camera optical lens.

As an improvement, the camera optical lens further satisfies a following condition: $FNO \leq 2.40$, where FNO denotes an F number of the camera optical lens.

As an improvement, the camera optical lens further satisfies a following condition: $FOV \geq 67°$, where FOV denotes a field of view of the camera optical lens.

As an improvement, the camera optical lens further satisfies a following condition: $0.60 \leq f12/f \leq 1.97$, where f12 denotes a combined focal length of the first lens and the second lens.

The present disclosure has advantageous effects in that the camera optical lens according to the present disclosure has excellent optical characteristics and is ultra-thin, wide-angle and has a large aperture, making it especially suitable for camera optical lens assembly of mobile phones and WEB camera optical lenses formed by high-pixel camera elements such as CCD and CMOS.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will hereinafter be described in detail with reference to several embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Embodiment 1

Figure 1:
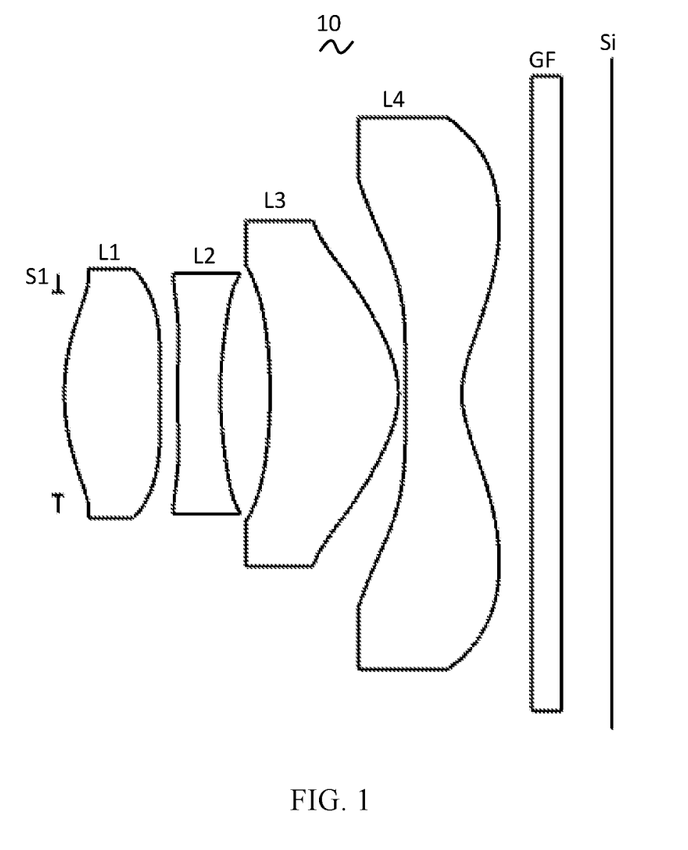
FIG. 1 is a schematic diagram of a structure of a camera optical lens according to Embodiment 1 of the present disclosure.

The present disclosure provides a camera optical lens 10. FIG. 1 shows the camera optical lens 10 according to Embodiment 1 of the present disclosure. The camera optical lens 10 includes four lenses. For example, the camera optical lens 10 includes, from an object side to an image side, an aperture S1, a first lens L1, a second lens L2, a third lens L3, and a fourth lens L4. In the present embodiment, as an example, an optical element such as a glass filter (GF) can be arranged between the fourth lens L4 and an image plane S1, and the glass fiber GF can be a glass plate or can be an optical filter. In other embodiments, the glass fiber GF can also be arranged at other positions.

In the present embodiment, the first lens L1 has a positive refractive power, the second lens L2 has a negative refractive power, the third lens L3 has a positive refractive power, and the fourth lens L4 has a negative refractive power.

In the present embodiment, a focal length of the camera optical lens 10 is defined as f, a focal length of the second lens L2 is defined as f2, a curvature radius of an object side surface of the first lens L1 is defined as R1, a curvature radius of an image side surface of the first lens L1 is defined as R2, a curvature radius of an object side surface of the second lens L2 is defined as R3, and a curvature radius of an image side surface of the second lens L2 is defined as R4, a curvature radius of an object side surface of the third lens L3 is defined as R5, and a curvature radius of an image side surface of the third lens L3 is defined as R6. The camera optical lens 10 should satisfy following conditions:

$$0.10 \leq R1/R2 \leq 0.20 \quad (1);$$

$$1.10 \leq R3/R4 \leq 1.50 \quad (2);$$

$$5.50 \leq R5/R6 \leq 6.50 \quad (3); \text{ and}$$

$$-6.50 \leq f2/f \leq -4.50 \quad (4).$$

The condition (1) specifies a shape of the first lens. This condition is beneficial for the correction of the aberrations, to improve the imaging quality.

The condition (2) specifies a shape of the second lens. This condition is beneficial for improving the performance of the optical system. As an example, $1.14 \leq R3/R4 \leq 1.50$.

The condition (3) specifies a shape of the third lens. This condition can alleviate the deflection of light passing through the lens while effectively reducing aberrations.

The condition (4) specifies a ratio of the focal length f2 of the second lens L2 to the focal length f of the system. This condition can effectively correct the aberrations, so as to improve the imaging quality.

An on-axis thickness of the first lens L1 is defined as d1, and an on-axis distance from an image side surface of the first lens L1 to an object side surface of the second lens L2 is defined as d2. The camera optical lens 10 should satisfy a condition of $5.50 \leq d1/d2 \leq 7.50$. When d1/d2 satisfies this condition, the processing and assembly of lenses can be facilitated.

In the present embodiment, the first lens L1 includes an object side surface being convex in a paraxial region, and an image side surface being concave in the paraxial region.

Here, a focal length of the first lens L1 is defined as f1, and the focal length of the camera optical lens 10 is defined as f. The camera optical lens 10 should satisfy a condition of $0.53 \leq f1/f \leq 1.81$, which specifies a ratio of the refractive power of the first lens L1 to the focal length f of the system. When the condition is satisfied, the first lens L1 has an appropriate positive refractive power, thereby facilitating the reduction of aberrations of the system while facilitating development towards ultra-thin, wide-angle lenses. As an example, $0.84 \leq f1/f \leq 1.44$.

A curvature radius of the object side surface of the first lens L1 is defined as R1, and a curvature radius of the image side surface of the first lens L1 is defined as R2. The camera optical lens 10 should satisfy a condition of $-3.00 \leq (R1+R2)/(R1-R2) \leq -0.82$, control a shape of the first lens L1 in such a manner that the first lens L1 can effectively correct spherical aberrations of the system. As an example, $-1.87 \leq (R1+R2)/(R1-R2) \leq -1.02$.

An on-axis thickness of the first lens L1 is defined as d1, and a total optical length from the object side surface of the first lens L1 to an image plane of the camera optical lens along an optic axis is defined as TTL. The camera optical lens 10 should satisfy a condition of $0.07 \leq d1/TTL \leq 0.26$, which can achieve the ultra-thin lenses. As an example, $0.12 \leq d1/TTL \leq 0.21$.

In the present embodiment, the second lens L2 includes the object side surface being convex in a paraxial region and the image side surface being concave in the paraxial region.

A curvature radius of the object side surface of the second lens L2 is defined as R3, and a curvature radius of the image side surface of the second lens L2 is defined as R4. The camera optical lens 10 should satisfy a condition of $2.52 \leq (R3+R4)/(R3-R4) \leq 17.98$, which specifies a shape of the second lens L2. This condition can facilitate the correction of an on-axis aberration with development towards ultra-thin, wide-angle lenses. As an example, 4.03≤(R3+R4)/(R3−R4)≤14.38.

An on-axis thickness of the second lens L2 is defined as d3, and the total optical length from the object side surface of the first lens L1 to an image plane of the camera optical lens 10 along an optic axis is defined as TTL. The camera optical lens 10 should satisfy a condition of 0.03≤d3/TTL≤0.12, which can achieve the ultra-thin lenses. As an example, 0.04≤d3/TTL≤0.10.

In the present embodiment, the third lens L3 includes the object side surface being concave in a paraxial region and the image side surface being convex in the paraxial region.

A focal length of the third lens L3 is defined as f3, and the focal length of the camera optical lens 10 is defined as f. The camera optical lens 10 further satisfies a condition of 0.22≤f3/f≤0.75. The appropriate distribution of the refractive power leads to better imaging quality and a lower sensitivity of the system. As an example, 0.34≤f3/f≤0.60.

A curvature radius of the object side surface of the third lens L3 is defined as R5, and a curvature radius of the image side surface of the third lens L3 is defined as R6. The camera optical lens 10 should satisfy a condition of 0.68≤(R5+R6)/(R5−R6)≤2.17, which specifies a shape of the third lens L3, thereby facilitating shaping of the third lens L3. This condition can alleviate the deflection of light passing through the lens while effectively reducing aberrations. As an example, 1.09≤(R5+R6)/(R5−R6)≤1.73.

An on-axis thickness of the third lens L3 is defined as d5, and the total optical length from the object side surface of the first lens L1 to an image plane of the camera optical lens 10 along an optic axis is defined as TTL. The camera optical lens 10 should satisfy a condition of 0.12≤d5/TTL≤0.39, which can achieve the ultra-thin lenses. As an example, 0.19≤d5/TTL≤0.31.

In the present embodiment, the fourth lens L4 includes the object side surface being concave in a paraxial region and the image side surface being concave in the paraxial region.

A focal length of the fourth lens L4 is f4, and the focal length of the camera optical lens 10 is f. The camera optical lens 10 further satisfies a condition of −0.94≤f4/f≤−0.26, which specifies a ratio of the focal length f4 of the fourth lens L4 to the focal length of the system. This condition can facilitate the improvement of an optical performance of the system. As an example, −0.59≤f4/f≤−0.32.

A curvature radius of the object side surface of the fourth lens L4 is defined as R7, and a curvature radius of the image side surface of the fourth lens L4 is defined as R8. The camera optical lens 10 should satisfy a condition of 0.50≤(R7+R8)/(R7−R8)≤1.87, which specifies a shape of the fourth lens L4. This condition can facilitate the correction of an off-axis aberration with development towards ultra-thin, wide-angle lenses. As an example, 0.79≤(R7+R8)/(R7−R8)≤1.50.

An on-axis thickness of the fourth lens L4 is defined as d7, and the total optical length from the object side surface of the first lens L1 to an image plane of the camera optical lens 10 along an optic axis is defined as TTL. The camera optical lens 10 should satisfy a condition of 0.05≤d7/TTL≤0.15, which can achieve the ultra-thin lenses. As an example, 0.08≤d7/TTL≤0.12.

In the present embodiment, an image height of the camera optical lens 10 is defined as IH, and the total optical length of the camera optical lens 10 is defined as TTL. The camera optical lens 10 should satisfy a condition of TTL/IH≤1.86, which can achieve the ultra-thin lenses.

In the present embodiment, an F number (FNO) of the camera optical lens 10 is smaller than or equal to 2.40, thereby achieving a large aperture and high imaging performance.

In the present embodiment, a FOV (field of view) of the camera optical lens 10 is larger than or equal to 67°, thereby achieving the wide-angle performance.

In the present embodiment, the focal length of the camera optical lens 10 is defined as f, and a combined focal length of the first lens L1 and the second lens L2 is defined as f12. The camera optical lens 10 should satisfy a condition of 0.60≤f12/f≤1.97. This condition can eliminate aberration and distortion of the camera optical lens 10, suppress the back focal length of the camera optical lens 10, and maintain the miniaturization of the camera lens system group. As an example, 0.96≤f12/f≤1.58.

When the above conditions are satisfied, the camera optical lens 10 will have good optical performance while satisfying design requirements for ultra-thin, wide-angle lenses having large apertures. With these characteristics, the camera optical lens 10 is especially suitable for camera optical lens assembly of mobile phones and WEB camera optical lenses formed by high-pixel imaging elements such as CCD and CMOS.

The following examples will be used to describe the camera optical lens 10 of the present disclosure. The symbols recorded in each example will be described as follows. The focal length, on-axis distance, curvature radius, on-axis thickness, inflexion point position, and arrest point position are all in units of mm.

TTL: total optical length (total optical length from the object side surface of the first lens L1 to the image plane of the camera optical lens along the optic axis) in units of mm.

In an example, inflexion points and/or arrest points can be arranged on the object side surface and/or image side surface of the lens, in order to satisfy the demand for the high quality imaging. The specific implementations are described below.

Table 1 and Table 2 shows design data of the camera optical lens 10 according to Embodiment 1 of the present disclosure.

TABLE 1

|  | R | d | nd |  | vd |  |
|---|---|---|---|---|---|---|
| S1 | ∞ | d0 = 0.045 |  |  |  |  |
| R1 | 1.565 | d1 = 0.684 | nd1 | 1.5444 | v1 | 55.82 |
| R2 | 15.553 | d2 = 0.124 |  |  |  |  |
| R3 | 4.058 | d3 = 0.307 | nd2 | 1.6700 | v2 | 19.39 |
| R4 | 2.714 | d4 = 0.355 |  |  |  |  |
| R5 | −3.501 | d5 = 0.917 | nd3 | 1.5444 | v3 | 55.82 |
| R6 | −0.636 | d6 = 0.050 |  |  |  |  |
| R7 | −153.685 | d7 = 0.402 | nd4 | 1.5444 | v4 | 55.82 |
| R8 | 0.631 | d8 = 0.500 |  |  |  |  |
| R9 | ∞ | d9 = 0.210 | ndg | 1.5168 | vg | 64.17 |
| R10 | ∞ | d10 = 0.359 |  |  |  |  |

In the table, meanings of various symbols will be described as follows.

R: curvature radius of an optical surface, a central curvature radius for a lens;

S1: aperture;

R1: curvature radius of the object side surface of the first lens L1;

R2: curvature radius of the image side surface of the first lens L1;

R3: curvature radius of the object side surface of the second lens L2;

R4: curvature radius of the image side surface of the second lens L2;

R5: curvature radius of the object side surface of the third lens L3;

R6: curvature radius of the image side surface of the third lens L3;

R7: curvature radius of the object side surface of the fourth lens L4;

R8: curvature radius of the image side surface of the fourth lens L4;

R9: curvature radius of an object side surface of the optical filter GF;

R10: curvature radius of an image side surface of the optical filter GF;

d: on-axis thickness of a lens and an on-axis distance between adjacent lenses;

d0: on-axis distance from the aperture S1 to the object side surface of the first lens L1;

d1: on-axis thickness of the first lens L1;

d2: on-axis distance from the image side surface of the first lens L1 to the object side surface of the second lens L2;

d3: on-axis thickness of the second lens L2;

d4: on-axis distance from the image side surface of the second lens L2 to the object side surface of the third lens L3;

d5: on-axis thickness of the third lens L3;

d6: on-axis distance from the image side surface of the third lens L3 to the object side surface of the fourth lens L4;

d7: on-axis thickness of the fourth lens L4;

d8: on-axis distance from the image side surface of the fourth lens L4 to the object side surface of the optical filter GF;

d9: on-axis thickness of the optical filter GF;

d10: on-axis distance from the image side surface of the optical filter GF to the image plane;

nd: refractive index of d line;

nd1: refractive index of d line of the first lens L1;

nd2: refractive index of d line of the second lens L2;

nd3: refractive index of d line of the third lens L3;

nd4: refractive index of d line of the fourth lens L4;

ndg: refractive index of d line of the optical filter GF;

vd: abbe number;

v1: abbe number of the first lens L1;

v2: abbe number of the second lens L2;

v3: abbe number of the third lens L3;

v4: abbe number of the fourth lens L4;

vg: abbe number of the optical filter GF.

TABLE 2

|  | Conic coefficient | Aspherical surface coefficients | | | |
|---|---|---|---|---|---|
|  | k | A4 | A6 | A8 | A10 |
| R1 | −3.6341E+00 | 8.6109E−02 | −1.3775E−01 | 2.4361E−01 | −8.6873E−01 |
| R2 | 8.0000E+01 | −3.7804E−01 | −1.3894E−01 | 1.4418E+00 | −6.5325E+00 |
| R3 | −4.4426E+01 | −3.2901E−01 | −2.2262E−01 | 4.8811E−01 | 6.9400E−01 |
| R4 | 5.1625E+00 | −1.1120E−01 | −4.4553E−01 | 2.3178E+00 | −7.8559E+00 |
| R5 | 1.1970E+01 | 7.6088E−02 | −5.1489E−01 | −7.5297E−01 | 3.4899E+00 |
| R6 | −4.5612E+00 | −2.4751E−01 | 6.3121E−01 | −1.8404E+00 | 3.8940E+00 |
| R7 | −8.0000E+01 | −6.2267E−02 | −3.9010E−01 | 9.8214E−01 | −1.3737E+00 |
| R8 | −5.8537E+00 | −1.6720E−01 | 1.4037E−01 | −1.0096E−01 | 5.0739E−02 |

|  | Aspherical surface coefficients | | | | |
|---|---|---|---|---|---|
|  | A12 | A14 | A16 | A18 | A20 |
| R1 | 8.6892E−01 | 2.1359E+00 | −9.1620E+00 | 1.2223E+01 | −6.0431E+00 |
| R2 | 2.1523E+01 | −4.4069E+01 | 5.1877E+01 | −3.2335E+01 | 8.2440E+00 |
| R3 | 5.1510E+00 | −2.6036E+01 | 4.3425E+01 | −3.2749E+01 | 9.5215E+00 |
| R4 | 2.2282E+01 | −4.1235E+01 | 4.5239E+01 | −2.6885E+01 | 6.7477E+00 |
| R5 | −9.3284E+00 | 1.5568E+01 | −1.5012E+01 | 7.5643E+00 | −1.5385E+00 |
| R6 | −5.4741E+00 | 4.8925E+00 | −2.6124E+00 | 7.5397E−01 | −9.0312E−02 |
| R7 | 1.2142E+00 | −6.6984E−01 | 2.2301E−01 | −4.1066E−02 | 3.2192E−03 |
| R8 | −1.7648E−02 | 4.1563E−03 | −6.3347E−04 | 5.5618E−05 | −2.0916E−06 |

In Table 2, k is a conic coefficient, and A4, A6, A8, A10, A12, A14, A16, A18 and A20 are aspheric surface coefficients.

IH: image height $$y=(x^2/R)/\{1+[1-(1+k)(x^2/R^2)]^{1/2}\}+A4x^4+A6x^6+A8x^8+A10x^m+A12x^{12}+A14x^{14}+A16x^{16}+A18x^{18}+A20x^{20} \quad (5)$$

It should be noted that in the present embodiment, an aspheric surface of each lens uses the aspheric surfaces represented by the above condition (5). However, a specific form of the condition (5) is only an example, and it is not limited to the aspherical polynomial form represented by the condition (5).

Table 3 and Table 4 show design data of inflexion points and arrest points of respective lens in the camera optical lens 10 according to an embodiment of the present disclosure. P1R1 and P2R2 represent the object side surface and the image side surface of the first lens L1, respectively; P2R1 and P2R2 represent the object side surface and the image side surface of the second lens L2, respectively; P3R1 and P3R2 represent the object side surface and the image side surface of the third lens L3, respectively; and P4R1 and P4R2 represent the object side surface and the image side surface of the fourth lens L4, respectively. The data in the column "inflexion point position" indicates vertical distances from inflexion points arranged on each lens surface to the optic axis of the camera optical lens 10. The data in the column "arrest point position" indicates vertical distances from arrest points arranged on each lens surface to the optic axis of the camera optical lens 10.

TABLE 3

|  | Number of inflexion points | Inflexion point position 1 | Inflexion point position 2 |
|---|---|---|---|
| P1R1 | 1 | 0.635 | |
| P1R2 | 1 | 0.125 | |
| P2R1 | 2 | 0.225 | 0.675 |
| P2R2 | 0 | | |
| P3R1 | 0 | | |
| P3R2 | 1 | 0.945 | |
| P4R1 | 1 | 1.165 | |
| P4R2 | 1 | 0.445 | |

TABLE 4

|  | Number of arrest points | Arrest point position 1 | Arrest point position 2 |
|---|---|---|---|
| P1R1 | 1 | 0.825 | |
| P1R2 | 1 | 0.205 | |
| P2R1 | 2 | 0.385 | 0.835 |
| P2R2 | 0 | | |
| P3R1 | 0 | | |
| P3R2 | 0 | | |
| P4R1 | 0 | | |
| P4R2 | 1 | 1.225 | |

Figure 2:
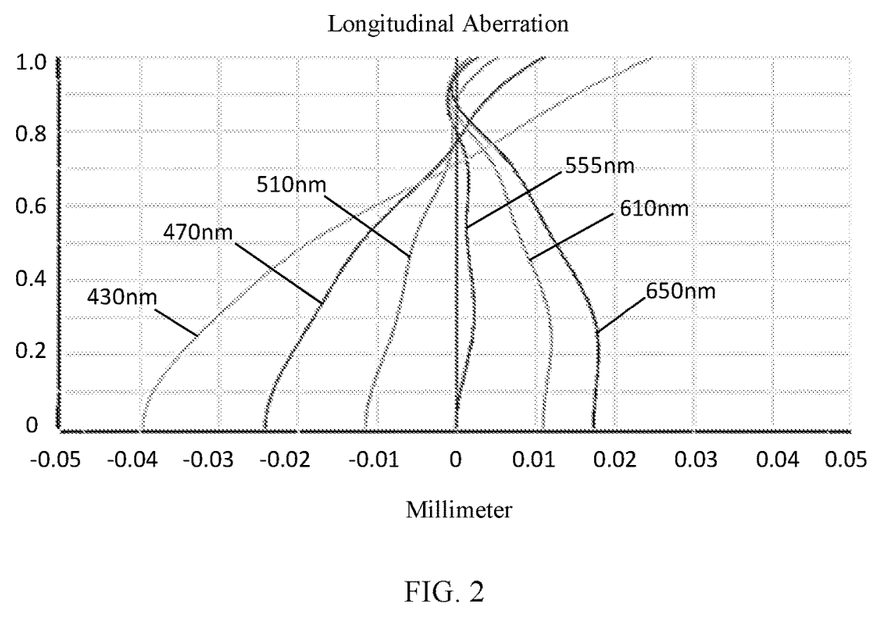
FIG. 2 is a schematic diagram of a longitudinal aberration of the camera optical lens shown in FIG. 1.
Figure 3:
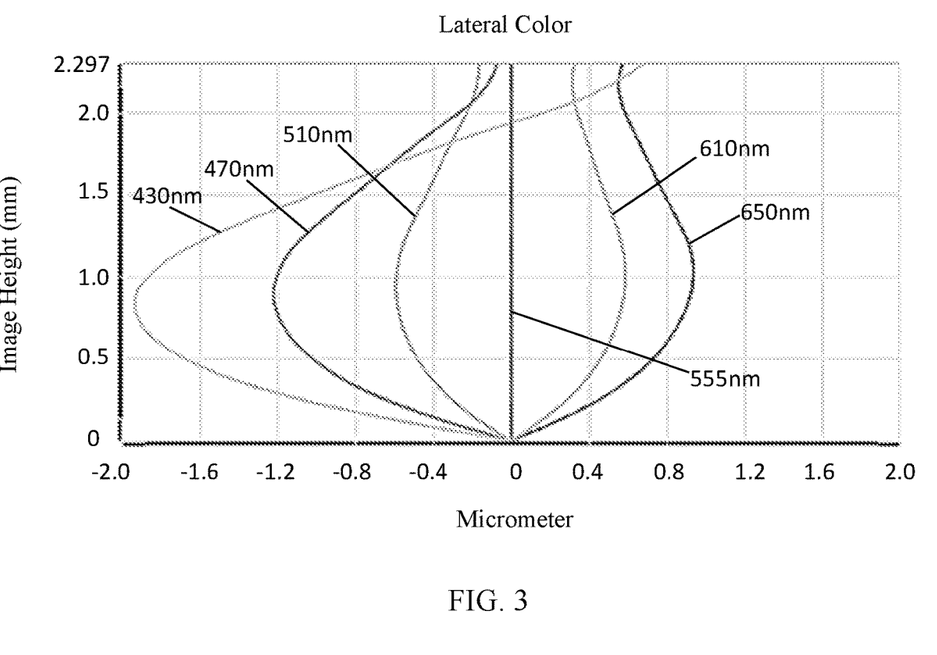
FIG. 3 is a schematic diagram of a lateral color of the camera optical lens shown in FIG. 1.
Figure 4:
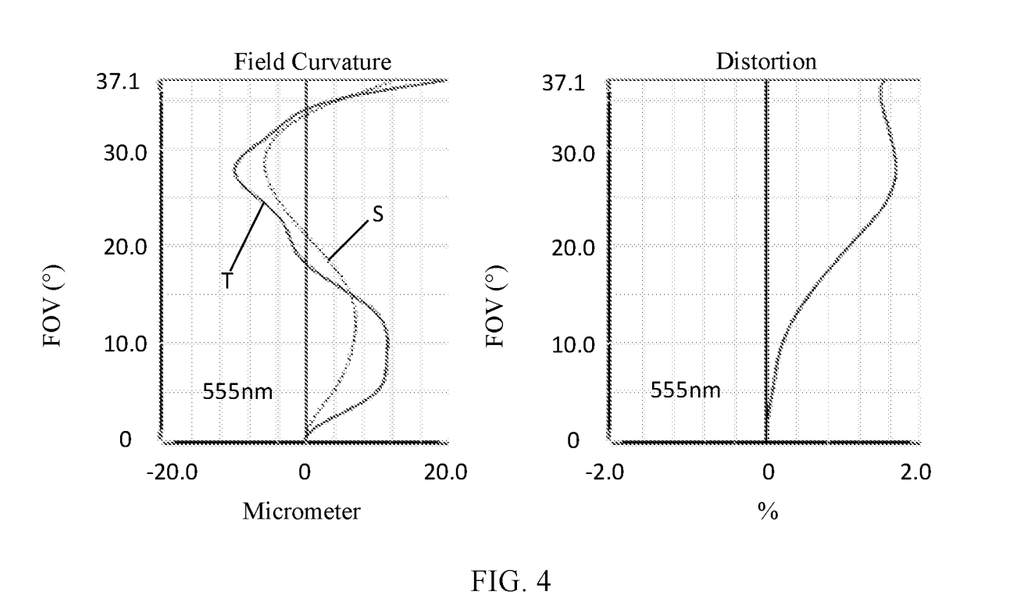
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 650 nm, 610 nm, 555 nm, 510 nm, 470 nm and 430 nm after passing the camera optical lens 10 according to Embodiment 1. FIG. 4 illustrates a field curvature and a distortion of light with a wavelength of 555 nm after passing the camera optical lens 10 according to Embodiment 1, in which a field curvature S is a field curvature in a sagittal direction and T is a field curvature in a tangential direction.

Table 13 below further lists various values of Embodiments 1, 2, and 3 and parameters which are specified in the above conditions.

As shown in Table 13, Embodiment 1 satisfies the respective conditions.

In the present embodiment, the entrance pupil diameter of the camera optical lens 10 is 1.465 mm. The image height is 2.297 mm. The FOV along a diagonal direction is 74.20°.

Thus, the camera optical lens 10 is an ultra-thin, large-aperture, wide-angle lens in which the on-axis and off-axis aberrations are sufficiently corrected, thereby leading to better optical characteristics.

Embodiment 2

Figure 5:
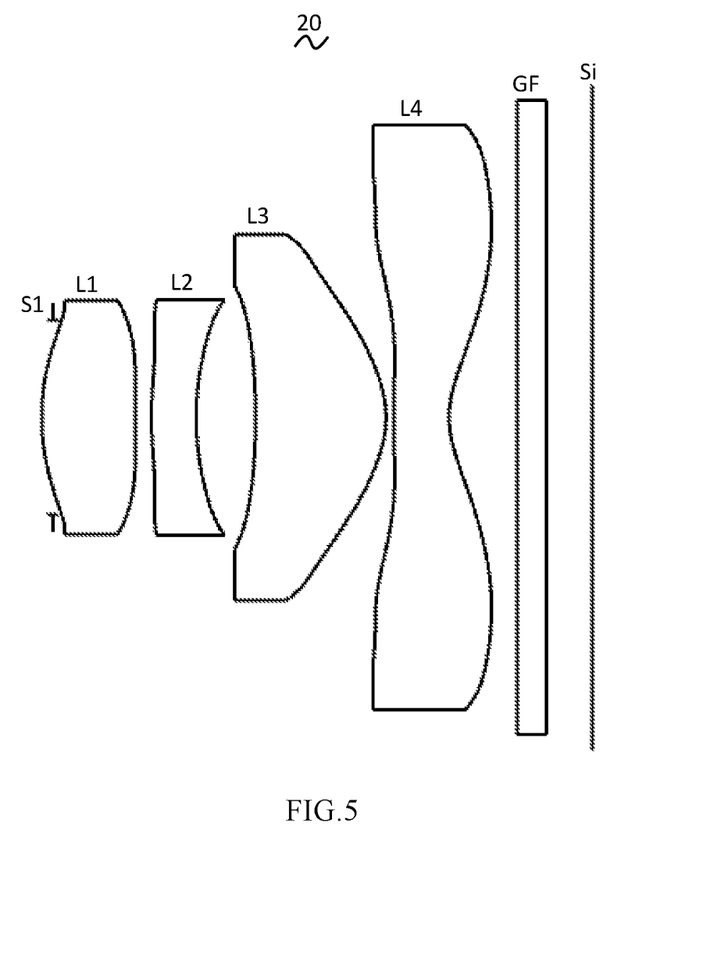
FIG. 5 is a schematic diagram of a structure of a camera optical lens according to Embodiment 2 of the present disclosure.

FIG. 5 is a structural schematic diagram of a camera optical lens 20 according to Embodiment 2. Embodiment 2 is basically the same as Embodiment 1 and involves symbols having the same meanings as Embodiment 1. Only differences therebetween will be described in the following.

In the present embodiment, the object side surface of the fourth lens L4 is convex in a paraxial region.

Table 5 and Table 6 show design data of a camera optical lens 20 in Embodiment 2 of the present disclosure.

TABLE 5

|  | R | d | nd | | vd | |
|---|---|---|---|---|---|---|
| S1 | ∞ | d0 = −0.083 | | | | |
| R1 | 1.636 | d1 = 0.679 | nd1 | 1.5444 | v1 | 55.82 |
| R2 | 8.185 | d2 = 0.118 | | | | |
| R3 | 2.448 | d3 = 0.325 | nd2 | 1.6700 | v2 | 19.39 |
| R4 | 1.954 | d4 = 0.433 | | | | |
| R5 | −4.744 | d5 = 0.949 | nd3 | 1.5444 | v3 | 55.82 |
| R6 | −0.745 | d6 = 0.055 | | | | |
| R7 | 6.035 | d7 = 0.402 | nd4 | 1.5444 | v4 | 55.82 |
| R8 | 0.667 | d8 = 0.500 | | | | |
| R9 | ∞ | d9 = 0.210 | ndg | 1.5168 | vg | 64.17 |
| R10 | ∞ | d10 = 0.335 | | | | |

Table 6 shows aspheric surface data of respective lenses in the camera optical lens 20 according to Embodiment 2 of the present disclosure.

TABLE 6

|  | Conic coefficient | Aspherical surface coefficients | | | |
|---|---|---|---|---|---|
|  | k | A4 | A6 | A8 | A10 |
| R1 | −3.7332E+00 | 8.5561E−02 | −3.9271E−02 | −1.8859E+00 | 1.5341E+01 |
| R2 | −2.1548E+01 | −4.3627E−01 | −3.6701E−01 | 5.6624E+00 | −2.8292E+01 |
| R3 | −1.6522E+01 | −3.5909E−01 | 6.6205E−01 | −4.8709E+00 | 2.2930E+01 |
| R4 | 3.2127E+00 | −5.5366E−02 | −1.2765E+00 | 7.7433E+00 | −2.7004E+01 |
| R5 | 1.9575E+01 | −9.4875E−03 | 3.3116E−01 | −1.7460E+00 | 2.6470E+00 |
| R6 | −4.7907E+00 | −2.3017E−01 | 2.3537E−01 | −8.8612E−02 | 6.9586E−02 |
| R7 | 5.0229E+00 | −2.4612E−01 | −1.4803E−02 | 3.9087E−01 | −5.4447E−01 |
| R8 | −5.3160E+00 | −1.2178E−01 | 2.8950E−02 | 3.1095E−02 | −3.1379E−02 |

|  | Aspherical surface coefficients | | | | |
|---|---|---|---|---|---|
|  | A12 | A14 | A16 | A18 | A20 |
| R1 | −6.4400E+01 | 1.5650E+02 | −2.2427E+02 | 1.7625E+02 | −5.8808E+01 |
| R2 | 8.6142E+01 | −1.6388E+02 | 1.8803E+02 | −1.1868E+02 | 3.1599E+01 |
| R3 | −5.6972E+01 | 8.4167E+01 | −7.5333E+01 | 3.8449E+01 | −8.7466E+00 |
| R4 | 5.9604E+01 | −8.1152E+01 | 6.4130E+01 | −2.5918E+01 | 3.8613E+00 |
| R5 | 4.4537E+00 | −2.3928E+01 | 3.9708E+01 | −3.0915E+01 | 9.4666E+00 |
| R6 | −5.9026E−01 | 1.1244E+00 | −8.9533E−01 | 3.2870E−01 | −4.6238E−02 |
| R7 | 4.0466E−01 | −1.7878E−01 | 4.6590E−02 | −6.6118E−03 | 3.9457E−04 |
| R8 | 1.1908E−02 | −2.1007E−03 | 1.2664E−04 | 7.3894E−06 | −8.8825E−07 |

Table 7 and Table 8 show design data of inflexion points and arrest points of respective lens in the camera optical lens 20 according to an embodiment of the present disclosure.

TABLE 7

|      | Number of inflexion points | Inflexion point position 1 | Inflexion point position 2 | Inflexion point position 3 |
|------|---|-------|-------|-------|
| P1R1 | 1 | 0.655 |       |       |
| P1R2 | 1 | 0.155 |       |       |
| P2R1 | 2 | 0.295 | 0.655 |       |
| P2R2 | 0 |       |       |       |
| P3R1 | 1 | 0.945 |       |       |
| P3R2 | 2 | 0.935 | 1.115 |       |
| P4R1 | 3 | 0.245 | 1.045 | 1.535 |
| P4R2 | 1 | 0.475 |       |       |

TABLE 8

|      | Number of arrest points | Arrest point position 1 | Arrest point position 2 |
|------|---|-------|-------|
| P1R1 | 0 |       |       |
| P1R2 | 1 | 0.265 |       |
| P2R1 | 2 | 0.575 | 0.715 |
| P2R2 | 0 |       |       |
| P3R1 | 1 | 0.985 |       |
| P3R2 | 0 |       |       |
| P4R1 | 1 | 0.425 |       |
| P4R2 | 1 | 1.405 |       |

Figure 6:
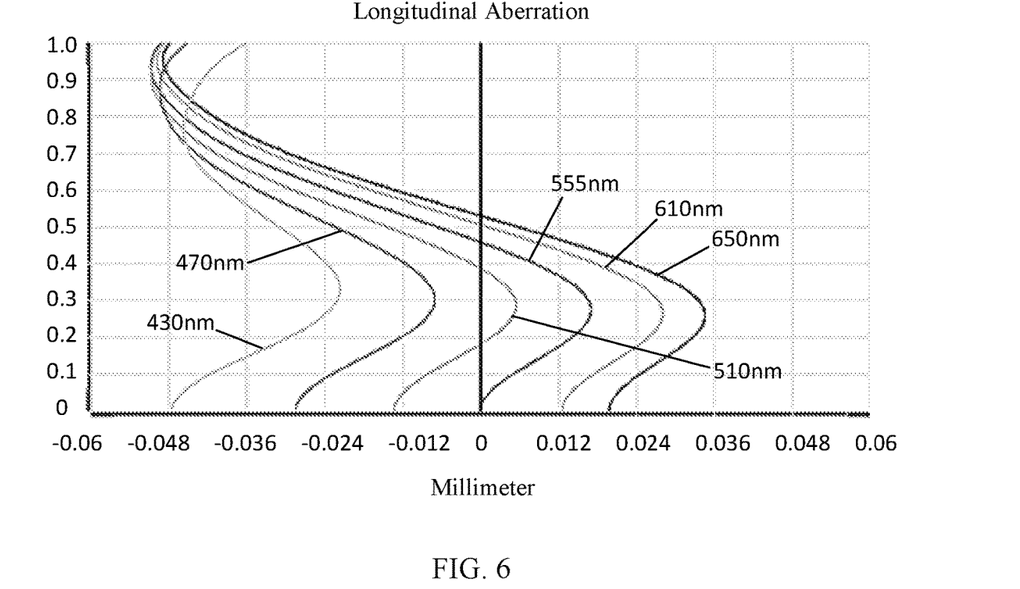
FIG. 6 is a schematic diagram of a longitudinal aberration of the camera optical lens shown in FIG. 5.
Figure 7:
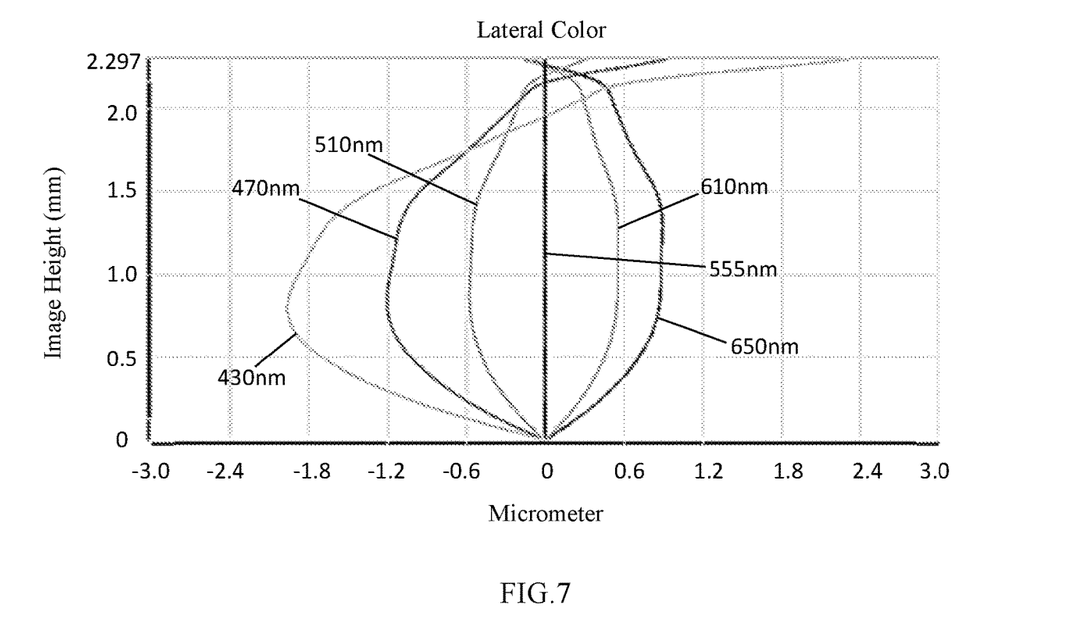
FIG. 7 is a schematic diagram of a lateral color of the camera optical lens shown in FIG. 5.
Figure 8:
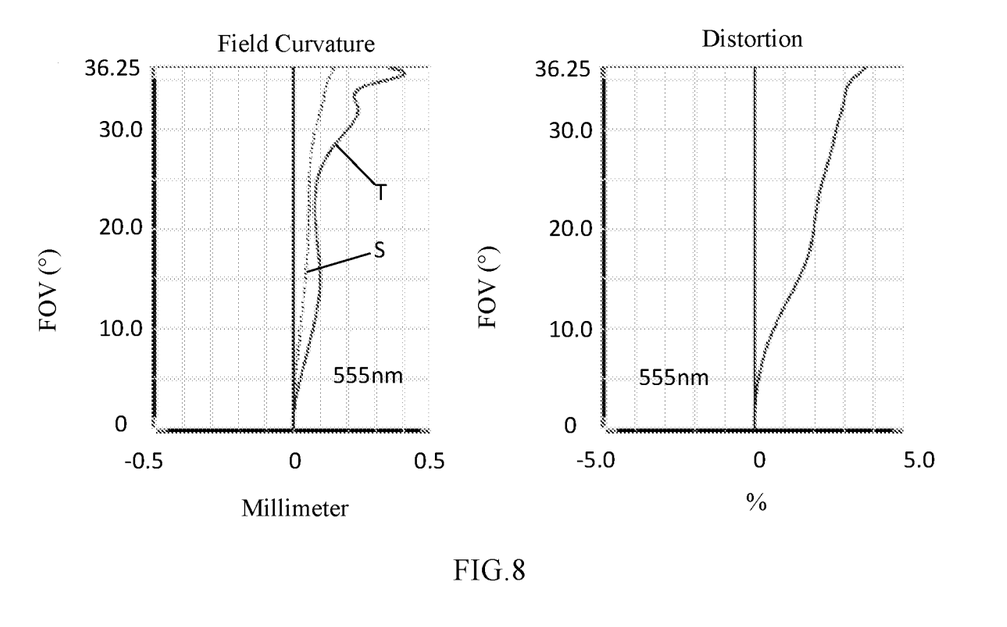
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 650 nm, 610 nm, 555 nm, 510 nm, 470 nm and 430 nm after passing the camera optical lens 20 according to Embodiment 2. FIG. 8 illustrates a field curvature and a distortion of light with a wavelength of 555 nm after passing the camera optical lens 20 according to Embodiment 2. In FIG. 8, a field curvature S is a field curvature in a sagittal direction, and T is a field curvature in a tangential direction.

Table 13 below lists various values of Embodiments 1, 2, and 3 and parameters which are specified in the above conditions.

As shown in Table 13, Embodiment 2 satisfies the respective conditions.

In the present embodiment, the entrance pupil diameter of the camera optical lens is 1.429 mm. The image height is 2.297 mm. The FOV along a diagonal direction is 72.50°. Thus, the camera optical lens 10 is an ultra-thin, large-aperture, wide-angle lens, thereby leading to better optical characteristics.

Embodiment 3

Figure 9:
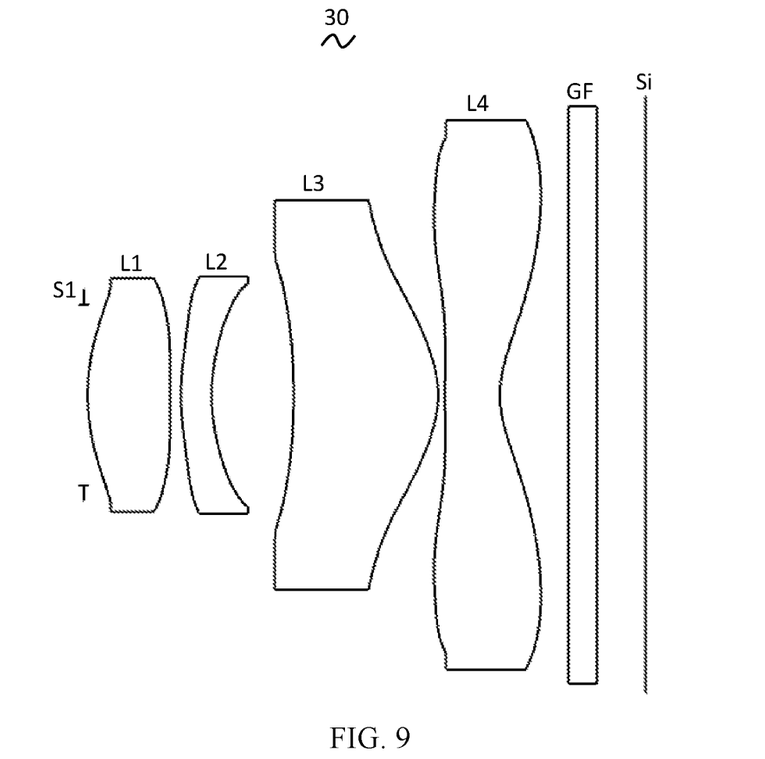
FIG. 9 is a schematic diagram of a structure of a camera optical lens according to Embodiment 3 of the present disclosure.

FIG. 9 is a structural schematic diagram of a camera optical lens 30 according to Embodiment 3. Embodiment 3 is basically the same as Embodiment 1 and involves symbols having the same meanings as Embodiment 1. Only differences therebetween will be described in the following.

In the present embodiment, the object side surface of the fourth lens L4 is convex in a paraxial region.

Table 9 and Table 10 show design data of a camera optical lens 30 in Embodiment 3 of the present disclosure.

TABLE 9

|     | R       | d          | nd  |        | vd  |       |
|-----|---------|------------|-----|--------|-----|-------|
| S1  | ∞       | d0 = 0.026 |     |        |     |       |
| R1  | 1.593   | d1 = 0.600 | nd1 | 1.5444 | v1  | 55.82 |
| R2  | 8.003   | d2 = 0.080 |     |        |     |       |
| R3  | 1.636   | d3 = 0.225 | nd2 | 1.6700 | v2  | 19.39 |
| R4  | 1.384   | d4 = 0.598 |     |        |     |       |
| R5  | -5.023  | d5 = 1.055 | nd3 | 1.5444 | v3  | 55.82 |
| R6  | -0.773  | d6 = 0.050 |     |        |     |       |
| R7  | 18.476  | d7 = 0.400 | nd4 | 1.5444 | v4  | 55.82 |
| R8  | 0.726   | d8 = 0.500 |     |        |     |       |
| R9  | ∞       | d9 = 0.210 | ndg | 1.5168 | vg  | 64.17 |
| R10 | ∞       | d10 = 0.355|     |        |     |       |

Table 10 shows aspheric surface data of respective lenses in the camera optical lens 30 according to Embodiment 3 of the present disclosure.

TABLE 10

| | Conic coefficient | Aspherical surface coefficients | | | |
|---|---|---|---|---|---|
| | k | A4 | A6 | A8 | A10 |
| R1 | -3.8632E+00 | 8.0704E-02 | -2.1627E-01 | 1.3600E+00 | -9.2986E+00 |
| R2 | -2.1279E+01 | -7.4310E-01 | 2.1636E+00 | -7.4138E+00 | 2.5913E+01 |
| R3 | -9.6501E+00 | -5.2019E-01 | 1.1749E+00 | -2.5273E+00 | 1.2533E+01 |
| R4 | 1.4188E+00 | -3.2948E-01 | -1.9898E-01 | 4.1153E+00 | -1.9661E+01 |
| R5 | 6.2667E+00 | -2.7836E-02 | 9.6228E-02 | -1.1179E+00 | 5.3438E+00 |
| R6 | -5.1845E+00 | -1.8062E-01 | 3.4574E-01 | -7.6484E-01 | 1.4407E+00 |
| R7 | 8.8870E+01 | -1.2705E-01 | -1.4620E-01 | 4.6492E-01 | -4.7369E-01 |
| R8 | -5.6811E+00 | -1.4075E-01 | 8.7767E-02 | -3.3552E-02 | 5.6929E-03 |

| | Aspherical surface coefficients | | | | |
|---|---|---|---|---|---|
| | A12 | A14 | A16 | A18 | A20 |
| R1 | 3.8907E+01 | -1.0384E+02 | 1.6953E+02 | -1.5388E+02 | 5.9256E+01 |
| R2 | -7.5075E+01 | 1.5110E+02 | -1.9185E+02 | 1.3756E+02 | -4.2496E+01 |
| R3 | -4.9959E+01 | 1.1938E+02 | -1.6566E+02 | 1.2463E+02 | -3.9521E+01 |
| R4 | 6.2561E+01 | -1.4053E+02 | 2.0677E+02 | -1.7508E+02 | 6.3826E+01 |
| R5 | -1.4011E+01 | 2.2353E+01 | -2.1632E+01 | 1.1534E+01 | -2.5624E+00 |
| R6 | -1.6911E+00 | 1.2664E+00 | -5.9972E-01 | 1.6235E-01 | -1.8890E-02 |
| R7 | 2.7345E-01 | -9.7903E-02 | 2.1436E-02 | -2.6187E-03 | 1.3628E-04 |
| R8 | 7.4668E-04 | -5.8220E-04 | 1.1694E-04 | -1.0444E-05 | 3.5489E-07 |

Table 11 and Table 12 show design data of inflexion points and arrest points of respective lens in the camera optical lens 30 according to an embodiment of the present disclosure.

TABLE 11

|  | Number of inflexion points | Inflexion point position 1 | Inflexion point position 2 | Inflexion point position 3 |
|---|---|---|---|---|
| P1R1 | 1 | 0.645 | | |
| P1R2 | 1 | 0.125 | | |
| P2R1 | 3 | 0.365 | 0.465 | 0.855 |
| P2R2 | 0 | | | |
| P3R1 | 1 | 0.935 | | |
| P3R2 | 2 | 0.775 | 1.395 | |
| P4R1 | 2 | 0.185 | 0.885 | |
| P4R2 | 1 | 0.475 | | |

TABLE 12

|  | Number of arrest points | Arrest point position 1 | Arrest point position 2 |
|---|---|---|---|
| P1R1 | 0 | | |
| P1R2 | 1 | 0.225 | |
| P2R1 | 0 | | |
| P2R2 | 0 | | |
| P3R1 | 0 | | |
| P3R2 | 0 | | |
| P4R1 | 2 | 0.315 | 1.305 |
| P4R2 | 1 | 1.485 | |

Figure 10:
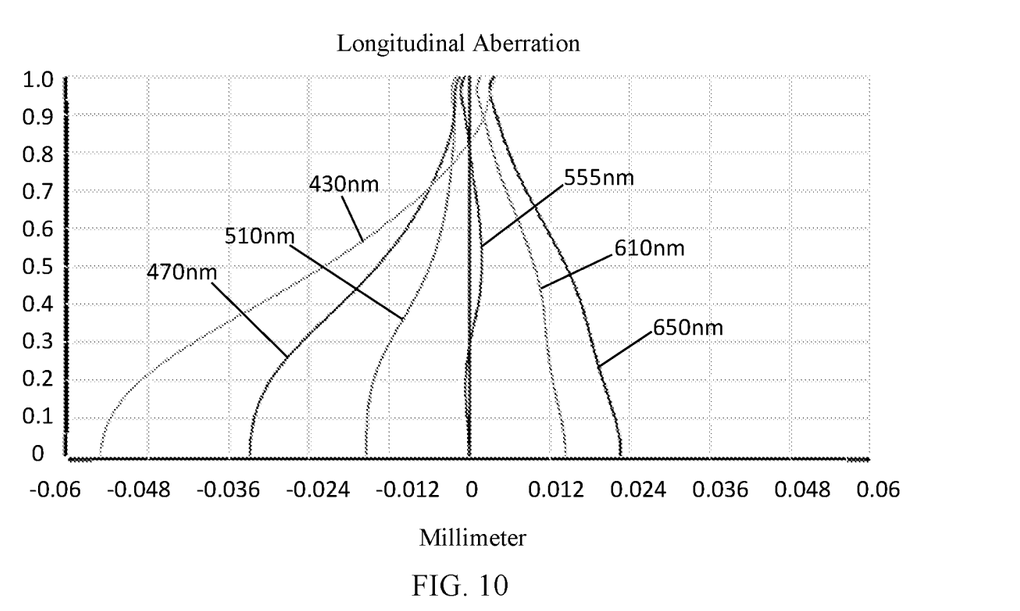
FIG. 10 is a schematic diagram of a longitudinal aberration of the camera optical lens shown in FIG. 9.
Figure 11:
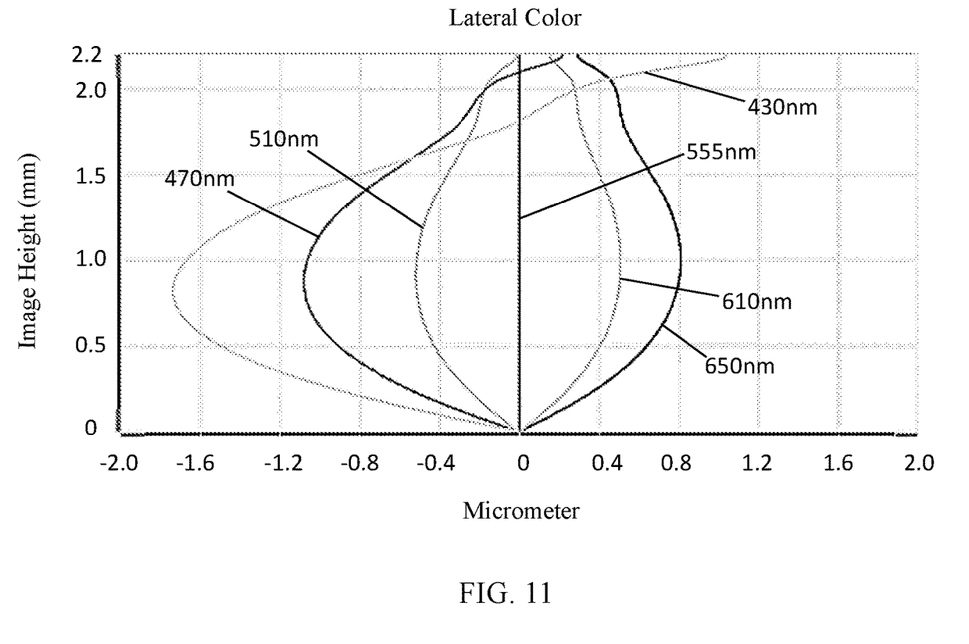
FIG. 11 is a schematic diagram of a lateral color of the camera optical lens shown in FIG. 9.
Figure 12:
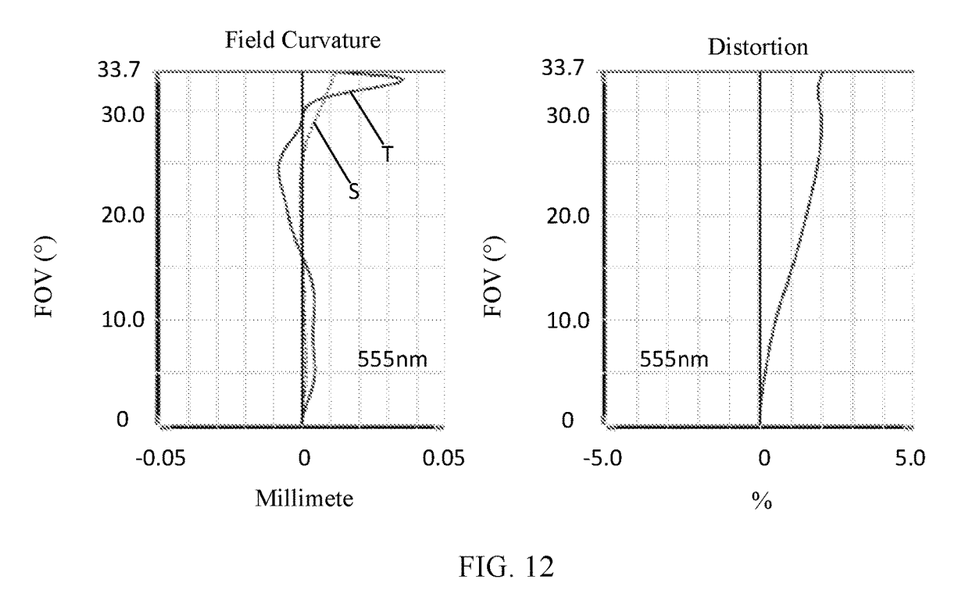
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 650 nm, 610 nm, 555 nm, 510 nm, 470 nm and 430 nm after passing the camera optical lens 30 according to Embodiment 3. FIG. 12 illustrates field curvature and distortion of light with a wavelength of 555 nm after passing the camera optical lens 30 according to Embodiment 3. In FIG. 12, a field curvature S is a field curvature in a sagittal direction, and T is a field curvature in a tangential direction.

Table 13 below lists various values of Embodiments 1, 2, and 3 and parameters which are specified in the above conditions.

As shown in Table 13, Embodiment 3 satisfies the respective conditions.

In the present embodiment, the entrance pupil diameter of the camera optical lens is 1.332 mm. The image height is 2.200 mm. The FOV along a diagonal direction is 67.40°. Thus, the camera optical lens 10 is an ultra-thin, large-aperture, wide-angle lens in which the on-axis and off-axis aberrations are sufficiently corrected, thereby leading to better optical characteristics.

TABLE 13

| Parameters and Conditions | Embodiment 1 | Embodiment 2 | Embodiment 3 |
|---|---|---|---|
| R1/R2 | 0.10 | 0.20 | 0.20 |
| R3/R4 | 1.50 | 1.25 | 1.18 |
| R5/R6 | 5.51 | 6.37 | 6.50 |
| f2/f | −4.50 | −6.49 | −6.50 |
| f | 2.967 | 3.001 | 3.197 |
| f1 | 3.132 | 3.612 | 3.524 |
| f2 | −13.356 | −19.485 | −20.780 |
| f3 | 1.279 | 1.494 | 1.539 |
| f4 | −1.149 | −1.411 | −1.395 |
| f12 | 3.656 | 3.947 | 3.820 |
| Fno | 2.03 | 2.10 | 2.40 |

In Table 13, Fno denotes an F number of the camera optical lens.

It can be appreciated by one having ordinary skill in the art that the description above is only embodiments of the present disclosure. In practice, one having ordinary skill in the art can make various modifications to these embodiments in forms and details without departing from the spirit and scope of the present disclosure.

What is claimed is:

1. A camera optical lens, comprising, from an object side to an image side:
a first lens having a positive refractive power;
a second lens having a negative refractive power;
a third lens having a positive refractive power; and
a fourth lens having a negative refractive power,
wherein the camera optical lens satisfies following conditions:

$0.10 \leq R1/R2 \leq 0.20$;

$1.10 \leq R3/R4 \leq 1.50$;

$5.50 \leq R5/R6 \leq 6.50$; and $-6.50 \leq f2/f \leq -4.50$, where
f denotes a focal length of the camera optical lens;
f2 denotes a focal length of the second lens;
R1 denotes a curvature radius of an object side surface of the first lens;
R2 denotes a curvature radius of an image side surface of the first lens;
R3 denotes a curvature radius of an object side surface of the second lens;
R4 denotes a curvature radius of an image side surface of the second lens;
R5 denotes a curvature radius of an object side surface of the third lens; and
R6 denotes a curvature radius of an image side surface of the third lens.

2. The camera optical lens as described in claim 1, further satisfying a following condition:

$5.50 \leq d1/d2 \leq 7.50$, where
d1 denotes an on-axis thickness of the first lens; and
d2 denotes an on-axis distance from the image side surface of the first lens to the object side surface of the second lens.

3. The camera optical lens as described in claim 1, further satisfying following conditions:

$0.53 \leq f1/f \leq 1.81$;

$-3.00 \leq (R1+R2)/(R1-R2) \leq -0.82$; and $0.07 \leq d1/TTL \leq 0.26$, where
f1 denotes a focal length of the first lens;
d1 denotes an on-axis thickness of the first lens; and
TTL denotes a total optical length from the object side surface of the first lens to an image plane of the camera optical lens along an optic axis.

4. The camera optical lens as described in claim 1, further satisfying following conditions:

$2.52 \leq (R3+R4)/(R3-R4) \leq 17.98$; and $0.03 \leq d3/TTL \leq 0.12$, where
d3 denotes an on-axis thickness of the second lens; and
TTL denotes a total optical length from the object side surface of the first lens to an image plane of the camera optical lens along an optic axis.

5. The camera optical lens as described in claim 1, further satisfying following conditions:

$0.22 \leq f3/f \leq 0.75;$ $0.68 \leq (R5+R6)/(R5-R6) \leq 2.17;$ and $0.12 \leq d5/TTL \leq 0.39,$ where f3 denotes a focal length of the third lens;
d5 denotes an on-axis thickness of the third lens; and
TTL denotes a total optical length from the object side surface of the first lens to an image plane of the camera optical lens along an optic axis.

6. The camera optical lens as described in claim 1, further satisfying following conditions:

$-0.94 \leq f4/f \leq -0.26;$ $0.50 \leq (R7+R8)/(R7-R8) \leq 1.87;$ and $0.05 \leq d7/TTL \leq 0.15,$ where f4 denotes a focal length of the fourth lens;
R7 denotes a curvature radius of an object side surface of the fourth lens;
R8 denotes a curvature radius of an image side surface of the fourth lens;
d7 denotes an on-axis thickness of the fourth lens; and
TTL denotes a total optical length from the object side surface of the first lens to an image plane of the camera optical lens along an optic axis.

7. The camera optical lens as described in claim 1, further satisfying a following condition:

$TTL/IH \leq 1.86,$ where

TTL denotes a total optical length from the object side surface of the first lens to an image plane of the camera optical lens along an optic axis; and
IH denotes an image height of the camera optical lens.

8. The camera optical lens as described in claim 1, further satisfying a following condition:

$FNO \leq 2.40,$ where

FNO denotes an F number of the camera optical lens.

9. The camera optical lens as described in claim 1, further satisfying a following condition:

$FOV \geq 67°,$ where

FOV denotes a field of view of the camera optical lens.

10. The camera optical lens as described in claim 1, further satisfying a following condition:

$0.60 \leq f12/f \leq 1.97,$ where f12 denotes a combined focal length of the first lens and the second lens.

* * * * *